United States Patent [19]
Maisch

[11] Patent Number: 6,081,081
[45] Date of Patent: Jun. 27, 2000

[54] ELECTRIC MOTOR-DRIVEN WHEEL BRAKE FOR VEHICLES

[75] Inventor: Wolfgang Maisch, Schwieberdingen, Germany

[73] Assignee: Robert Bosch GmbH, Stuttgart, Germany

[21] Appl. No.: 09/239,615

[22] Filed: Jan. 29, 1999

Related U.S. Application Data

[63] Continuation of application No. 08/702,829, Aug. 23, 1996, Pat. No. 5,962,997.

[30] Foreign Application Priority Data

Oct. 7, 1995 [DE] Germany ............................ 195 37 464

[51] Int. Cl.⁷ ........................................................ H02P 3/00
[52] U.S. Cl. ........................... 318/139; 318/362; 318/370; 180/65.3; 180/65.4
[58] Field of Search ............................ 318/139, 360–389; 320/104, 118, 15, 35, 39; 303/20, 21 BE; 180/65.3, 65.8, 65.4, 65.5, 165, 65.1, 234, 242, 244

[56] References Cited

U.S. PATENT DOCUMENTS

| | | |
|---|---|---|
| 3,608,981 | 9/1971 | Yui et al. ............................ 303/21 BE |
| 3,730,596 | 5/1973 | Felix ............................................. 303/3 |
| 4,477,764 | 10/1984 | Pollard ....................................... 320/62 |
| 4,934,761 | 6/1990 | Sauvageot ................................... 303/93 |
| 5,166,584 | 11/1992 | Fukino et al. ........................... 318/139 |
| 5,366,280 | 11/1994 | Littlejohn .................................... 303/3 |
| 5,376,868 | 12/1994 | Toyoda et al. .......................... 318/587 |
| 5,414,339 | 5/1995 | Masaki et al. .......................... 318/800 |
| 5,418,437 | 5/1995 | Couture et al. ......................... 318/139 |
| 5,465,806 | 11/1995 | Higasa et al. ........................... 180/165 |
| 5,539,641 | 7/1996 | Littlejohn ............................ 364/426.01 |
| 5,630,656 | 5/1997 | Stewart .................................. 303/9.62 |
| 5,765,656 | 6/1998 | Weaver .................................. 180/65.3 |
| 5,883,496 | 3/1999 | Esaki et al. .............................. 320/132 |

FOREIGN PATENT DOCUMENTS

| | | |
|---|---|---|
| 2225397 | 5/1990 | United Kingdom . |
| 9424453 | 10/1994 | WIPO . |

*Primary Examiner*—Paul Ip
*Attorney, Agent, or Firm*—Fulbright & Jaworski, LLP

[57] ABSTRACT

The wheel brakes of each vehicle axle or side or diagonal are supplied with current by a separate voltage source. To reduce the load on the vehicle's electrical system, the wheel brakes of a front axle are supplied with current first, and then the wheel brakes of a rear axle are supplied with current.

2 Claims, 3 Drawing Sheets

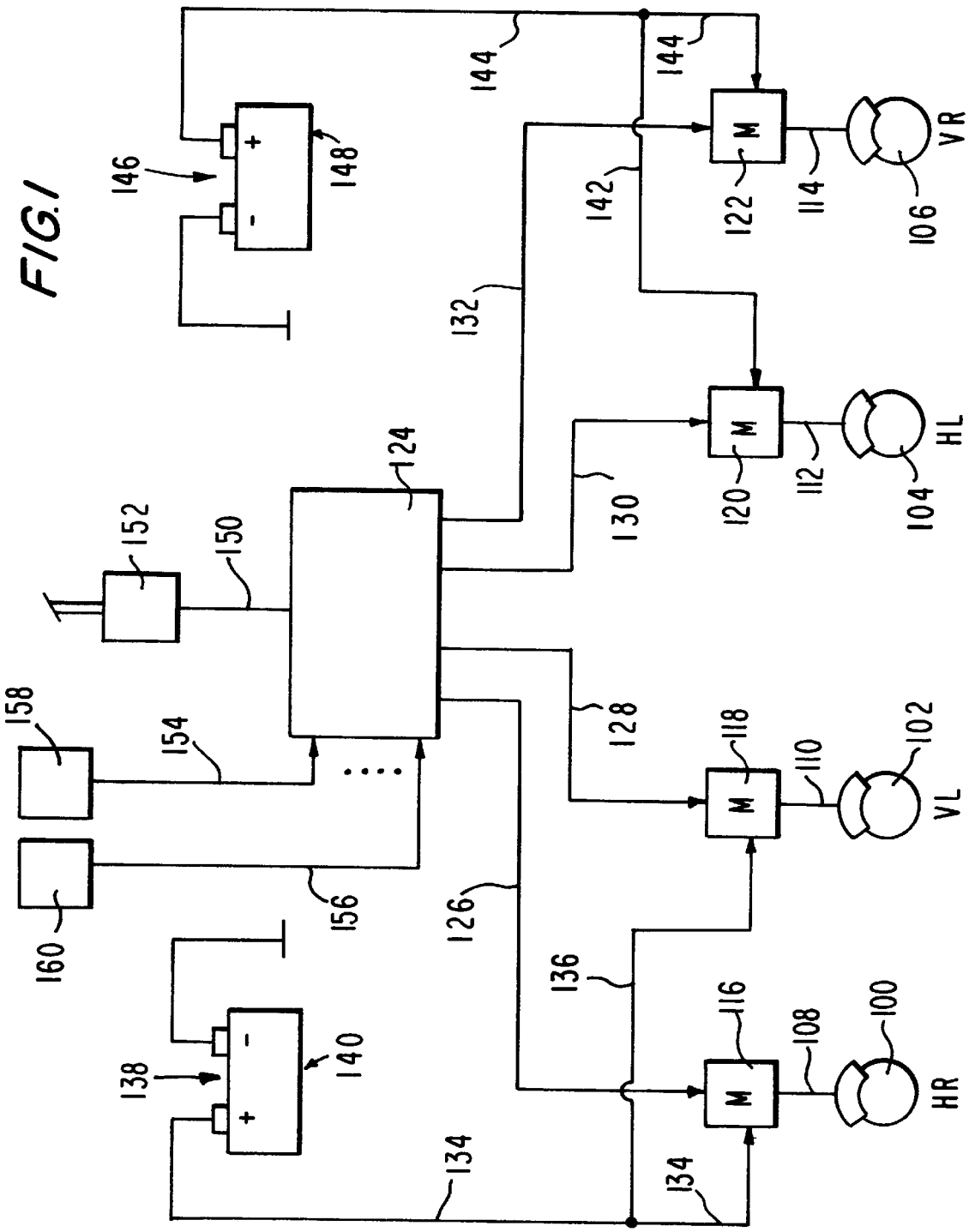

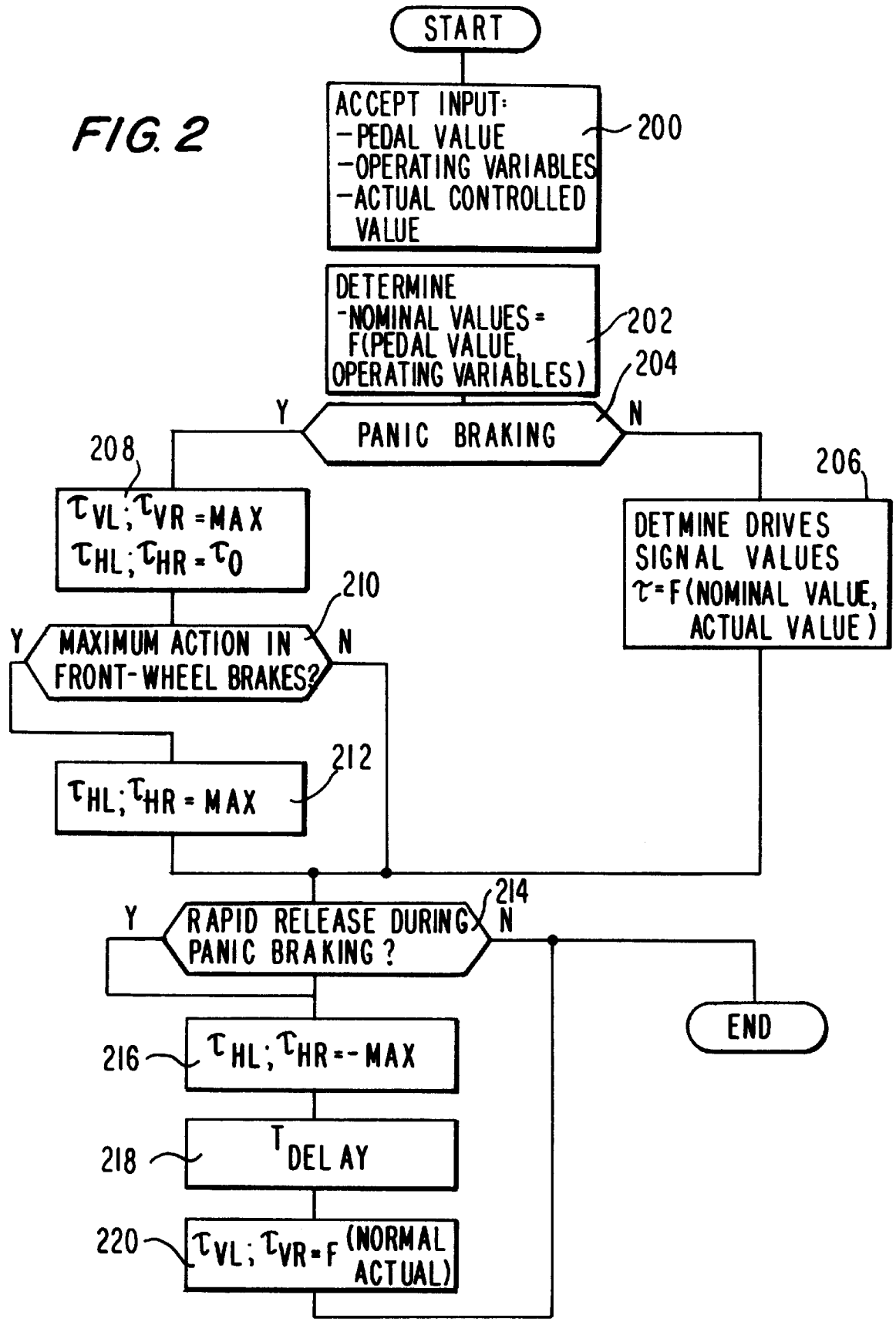

ELECTRIC MOTOR-DRIVEN WHEEL
BRAKE FOR VEHICLES

This application is a continuation of Ser. No. 08/702,829 filed on Aug. 23, 1996, which is now U.S. Pat. No. 5,962, 997.

BACKGROUND OF THE INVENTION

The invention pertains to an electric motor-driven wheel brake for vehicles wherein an electronic control unit transmits drive signals for electric motor driven actuators as a function of the driver's command, the actuators being supplied with current by at least two independent voltage sources.

Electric motor-driven wheel brakes for vehicles are known. WO A 94/24,453, for example, describes a wheel brake in which the brake application force is produced by an electric motor. When the brake system of a vehicle is designed with electric motor-driven brakes, special attention must be paid to the reliability with which a brake system of this type will operate, the key point being the reliability of the voltage supply made available by the batteries.

SUMMARY OF THE INVENTION

The object of the invention is to minimize the load on the batteries for electric motor driven wheels brakes while still maintaining the braking action. This is achieved by supplying actuators of the wheel brakes of each vehicle axle or each vehicle diagonal with current from a separate voltage source, and by actuating the wheel brakes of the front axle before the brakes of the rear axle in at least one braking situation.

The brake system can be reliably controlled even in situations in which the driver steps heavily on the brakes, for example in panic braking situations or during full brake applications.

It is especially advantageous that the brake system can also be reliably controlled even when the adhesion coefficient drops suddenly from a high value to a very low value and the brake is very quickly released.

It is especially advantageous that the reliable operation of the brake system is ensured even when at least one of the batteries is weak.

BRIEF DESCRIPTION OF THE DRAWING

FIG. 1 shows an overall circuit diagram of a preferred design of a brake system, which can be driven by an electric motor;

FIG. 2 shows a flow diagram, which illustrates a realization of the brake control system in the form of a computer program.

DESCRIPTION OF THE PREFERRED EMBODIMENTS

Figure 3A:
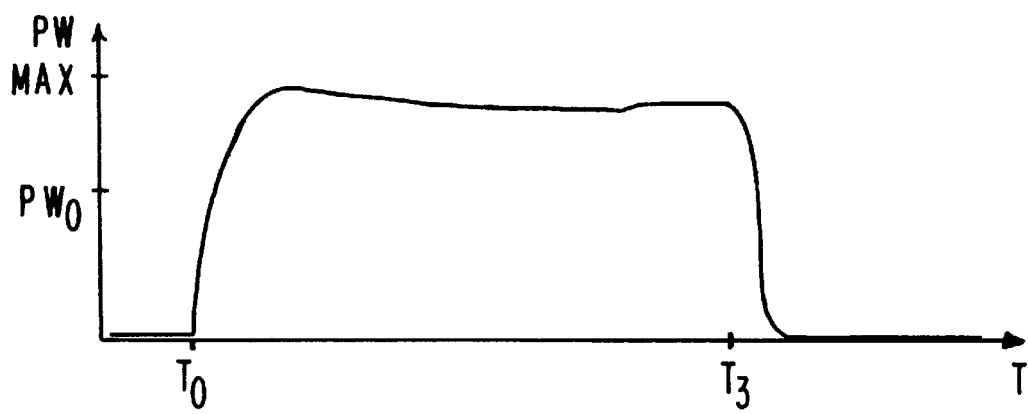
FIG. 3 shows time graphs which illustrate how the brake control system works.

FIG. 1 shows a preferred design of an electric motor-driven brake system for vehicles. In FIG. 1, four wheel brakes are illustrated, which are assigned to the four wheels of the vehicle. Wheel brake 100 is assigned to the right rear wheel, wheel brake 102 to the left front wheel, wheel brake 104 to the left rear wheel, and wheel brake 106 to the right front wheel. The wheel brakes are connected by way of mechanical lines 108, 110, 112, 114 to electric motor-driven actuators 116, 118, 120, 122, one of which is assigned to each of the wheel brakes. The electric motor-driven actuators are driven by an electronic control unit 124 transmitting over output lines 126, 128, 130, 132. For reasons of safety and reliability, the on-board electrical system supplying voltage to the actuators is designed redundantly. The brakes on each pair of diagonally opposite wheels are connected to one of the two batteries; the associated actuators are supplied with power by the battery assigned to the diagonal in question. Thus actuators 116 and 118 at the right rear and left front wheels are connected by way of feed lines 134, 136 to positive pole 138 of a first battery 140. In a corresponding manner, actuators 120, 122 at the left rear and right front wheels are connected by feed lines 142, 144 to positive pole 146 of a second battery 148.

At least one signal representing the degree to which the brake pedal has been actuated is sent to electronic control unit 124 from a pedal sensor 152 over an input line 150. In addition, input lines 154–156 from measuring devices 158–160 are also connected to electronic control unit 124; these devices measure operating variables of the brake system and/or of the vehicle. Such operating variables include, for example, the wheel loads, a variable for the actual value of the braking action produced at each wheel brake (e.g., current, brake moment, braking power, slip, wheel rpm's, etc.), the wheel rpm's, the vehicle velocity, the wear on the brake linings, etc. In addition, electronic control unit 124 is supplied with power by at least one of the batteries 140, 148. The corresponding connecting line is not shown in FIG. 1 for reasons of clarity.

In addition to the illustrated diagonal division of the brake circuits, it is also possible in other advantageous exemplary embodiments for the brake circuit to be divided in such a way that the wheel brakes of one side of the vehicle or of one axle are combined into one brake circuit. A voltage source would then be assigned to the actuators belonging to each of the two different pairs of wheels.

The basic way in which the control of a brake system such as this works is as follows. As a function of additional operating variables such as wheel loads, brake lining wear, tire size, battery voltage, etc., electronic control unit 124 uses the degree of brake pedal actuation transmitted to it to calculate a nominal value for each wheel brake, this value representing a measure of the braking action to be reached at the wheel brake (e.g., braking moment, brake power, current through the electric motor, rotational angle of the electric motor, wheel slip, wheel rpm's, etc.). Controller units, which generate output signals designed to match the actual values to the nominal values as a function of a predefined control strategy (e.g., PID), carry out the control of the braking action by adjusting it to the predefined nominal value. The actual values in this case are either measured at the wheel brakes or calculated from variables measured there. For example, the contact force of the brake linings or the drive moment of the motor, which is a direct measure of the braking action exerted in the corresponding wheel brake, can be derived from the current passing through the electric motor. In addition, the exerted braking power can be measured by strain gauges or other suitable sensors, and the exerted braking moment can be determined as a function of the design of the brakes. The torsion angle can be determined by appropriate angle sensors at the wheel brakes.

The controller output signals for each wheel brake are converted by electronic control unit 124 into drive signals for the corresponding actuators. Depending on how the motor containing the electric actuators is designed, i.e., whether it is a stepping motor or a commutator motor or a motor with electronic commutation, the drive signal value represents either a number of steps to be transmitted, a pulse-duty factor, a voltage value, a current value, etc. In the preferred exemplary embodiment, the actuators have commutator motors, which can be powered in both directions with a pulse-shaped drive signal with variable pulse-duty factor by way of a full-bridge high-level stage. The pulse-duty factor is generated by the microcomputer of control unit 124 as a function of the controller output signals and moves the commutator motor against restoring forces to a predetermined position.

In some braking situations such as panic braking, during which the driver actuates the brake pedal very quickly and almost completely, all the electric motors of the actuators are drawing maximum current as part of the control process described above to ensure the very rapid (e.g., in 150 ms) actuation of the braking devices even on driving surfaces with high friction. The batteries which supply the electric motors are required in these cases to provide very high peak currents. If the batteries are weak, there is the danger that the battery voltage will collapse and the brakes will no longer be able to operate s desired.

To reduce the maximum power demand on the batteries in these braking situations (panic brakings, full braking, emergency braking with weak batteries, etc.), in a preferred exemplary embodiment the electric motors for the front-wheel brakes are supplied with maximum current. The electric motors for the rear-wheel brakes are first operated with limited current to take up the brake slack and bring the linings into contact. After the front-wheel brakes have achieved their maximum effect, the power reduction to the rear-wheel brakes is suspended, and these brakes are now also provided with maximum current.

In addition to the actuation of the electric motors with maximum current in panic braking situations, in another advantageous exemplary embodiment in this or in the other above-cited braking situations, the front wheels are adjusted as a function of the nominal and actual values as part of the original control strategy, whereas the rear-wheel brakes are actuated in accordance with the procedure described above only after a certain delay.

In a corresponding manner, when the brakes are released very quickly, which is necessary especially in cases of a negative discontinuity in the coefficient of friction, i.e., when the coefficient of the pavement falls suddenly to a very low value during a braking operation, especially a full braking (e.g., from pavement with good traction to glare ice), first the rear wheel brakes are released and then, after a certain delay, the front-wheel brakes. These measures lead to a reduction in the maximum load on the vehicle's electrical system without causing any significant increase in the braking distance, because most of the total braking power, usually about ⅔, is applied by the front wheels.

FIG. 2 shows how the brake system is controlled in a preferred exemplary embodiment, illustrated in the form of a flow diagram. For this purpose, electronic control unit 124 is equipped with at least one microcomputer, to which the above-cited operating parameters are transmitted and which generates the output signals described.

The subprogram illustrated in FIG. 2 is started at predetermined times. In the first step 200, the operating variables required for automatic control, e.g., the axle load, the vehicle velocity, the brake lining wear, etc.; the degree of actuation of the brake pedal; and the actual value of the braking action selected for evaluation for the control process (e.g., braking moment, brake power, brake current, etc.) are accepted as input. In the next step 202, the nominal values for the braking action of the individual wheel brakes are determined as a function of the degree of actuation of the brake pedal and possibly of the operating parameters in accordance with predetermined characteristic fields, tables, and/or calculation steps. In the following question step 204, the program checks to see whether an operating situation is present which could lead to an overload of the vehicle's electrical system. In the preferred exemplary embodiment, this is a so-called "panic" braking situation, in which the driver actuates the brake pedal very quickly and almost completely to achieve maximum braking action. Other operating situations are full brakings, when the brake pedal is actuated completely, or braking processes with at least one weakened battery (emergency operation). If none of these operating situations is present, that is, if operations are normal, then according to step 206 the drive signal values, i.e., in the preferred exemplary embodiment the pulse-duty factor T, is determined and transmitted by the automatic control circuits in accordance with the nominal and actual values for each wheel brake. After step 206, the subprogram ends and is ready to be started up again at the next appropriate time.

In the preferred exemplary embodiment, the program checks in step 204 to see whether a panic braking situation is present. This is done under consideration of the speed with which the brake pedal is actuated and possibly of the absolute value of the degree of actuation. If the velocity of brake pedal actuation exceeds a defined, variable threshold value, and if simultaneously the brake pedal is actuated beyond a defined value, the program recognizes that panic braking is in progress. When the degree of actuation of the brake pedal falls below a predetermined threshold value, the program assumes that panic braking has ended. In the former case, the answer to step 204 is "yes"; in the latter case, the answer is "no".

If panic braking is in progress, the driver wants to have maximum braking action in response to, for example, a dangerous situation. Therefore, the drive signal values $\tau_{VL}$ and $\tau_{VR}$ for the front-wheel brakes are raised to the maximum given value in step 208. In contrast, the drive signal values $\tau_{HL}$ and $\tau_{HR}$ for the rear wheel brakes are adjusted to a given value $\tau_0$, which is enough to bring the brake linings into contact and to overcome the slack in the brake. As a result, maximum braking action is obtained at the front-wheel brakes, and thus the driver's wish is satisfied, while at the same time the load on the vehicle's electrical system is reduced, because the rear-wheel brakes are drawing only a small amount of current. In question step 210, the program checks to see whether the front-wheel brakes are exerting their maximum braking action. This is done preferably on the basis of the actual value resulting from the control process, which is compared with a predetermined value expressing the maximum braking action; on the basis of the vehicle deceleration; or on the basis of the response of an anti-wheel lock brake system controller. If the maximum action is being exerted, then in step 212 the drive signal for the rear-axle brakes is also raised to the defined maximum value, which is possibly lower than that of the front-wheel brakes. Of course, an anti-wheel lock braking control is superimposed on the brake control shown in FIG. 2; this anti-wheel lock control ensures that the wheels do not lock in the braking situation described. The anti-wheel lock system controller acts in accordance with the known procedure on the actuating variable of the brake of the wheel starting to lock. In the present case, it reduces the brake current or the drive signal value or reverses the direction of the current. It is even more advantageous for the current in the front-wheel brakes to be reduced to zero immediately, and then, after the rear-wheel brakes have been released actively, for the front-wheel brakes to be released actively also, that is, by reversal of the current.

In accordance with a preferred embodiment, after step 206 or 212 or, in the case of a "no" answer to step 210, the program checks in step 214 to see whether the driver is releasing the brake pedal very quickly. Here, too, in analogy to step 204, the actuation velocity of the brake pedal is used and compared with a predetermined threshold value. If the brake pedal is not being released quickly, the subprogram ends and starts up again at the next appropriate time. If the program detects that the brake is being released rapidly, in step 216 the drive signal values $\tau_{HL}$, $\tau_{HR}$ for the rear-wheel brakes are determined on the basis of the current nominal and actual values (maximum current in the opposite direction). This leads to the immediate release of the rear-axle brakes as desired by the driver. The drive signal values for the front-wheel brakes remain unchanged initially. At the end of a predetermined delay in step 218, the drive signal values for the front-wheel brakes $\tau_{VL}$ and $\tau_{VR}$ are determined in step 220 in accordance with the current nominal and actual values, and the subprogram ends. The length of the delay is no more than a few 100 msec and is calculated in such a way that the complete release of the rear-axle brakes is ensured within the delay interval.

As mentioned above, the method according to the invention is preferably carried out not only during so-called panic braking situations but also in other braking situations. In the case of full braking, a corresponding method is implemented over the course of steps 208–220. If the solution according to the invention is used for emergency braking operation when the battery is weak, the goal in steps 208, 212, and 210 is not to achieve maximum braking; instead, the drive signal values are determined in accordance with the current nominal and actual values. In step 210, the program then asks whether the front-wheel brakes are producing the desired braking action (nominal value).

Figure 3B:
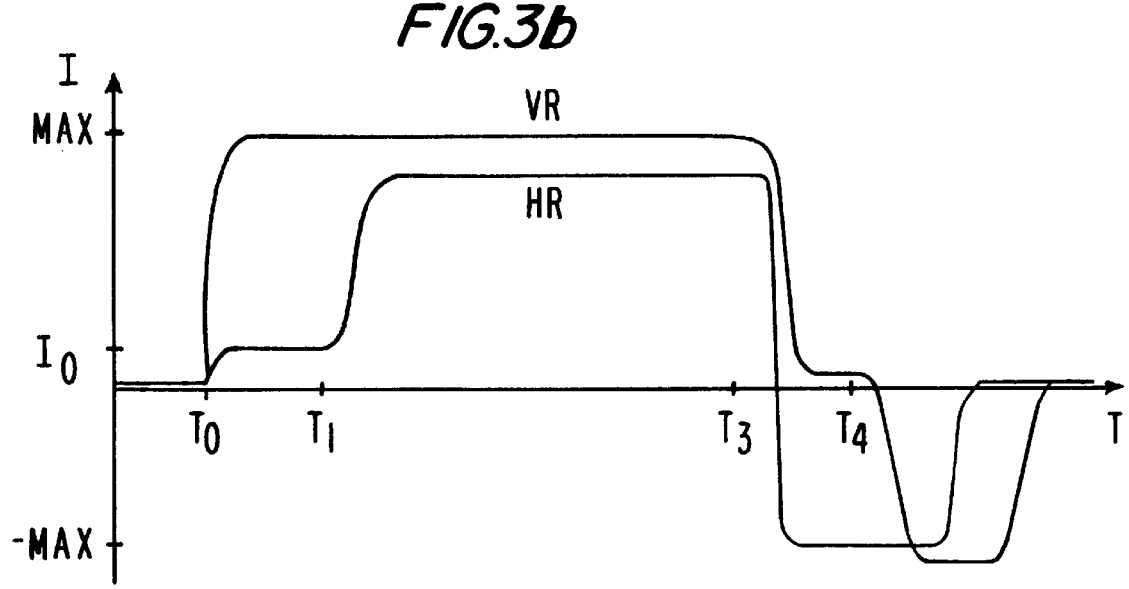
Figure 3C:
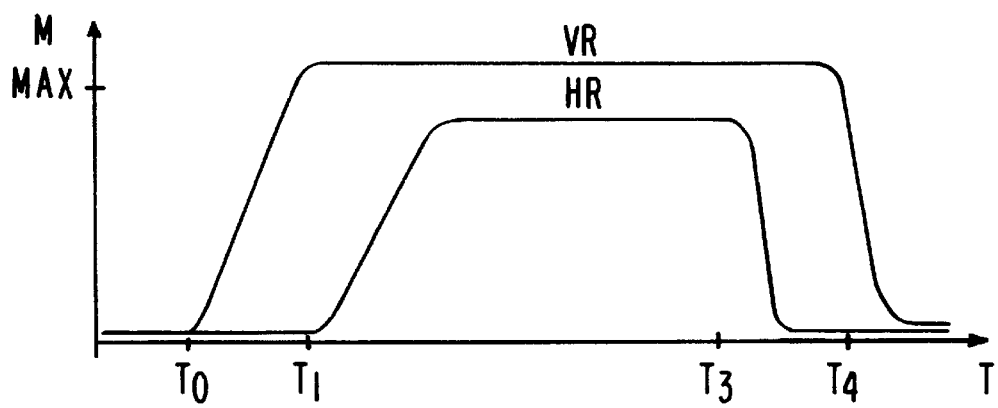

In FIG. 3, the preferred exemplary embodiment illustrated in FIG. 2 is shown on the basis of time graphs. FIG. 3a shows by way of example the course of the degree of actuation PW of the brake pedal during a panic braking situation. FIG. 3b shows the changes in the current at a front wheel and at a rear wheel. FIG. 3c shows the change in the braking moment exerted on a selected front and a selected rear wheel. At time $T_0$, the driver actuates the brake pedal very quickly and almost completely. Both the speed of actuation and the degree of actuation itself exceed the predefined threshold values, and thus the program recognizes a panic braking situation. This has the result that, at time $T_0$ or shortly thereafter, according to FIG. 3b, the current in the front-wheel brakes is raised to its maximum value and in the rear-wheel brakes to a value $I_0$. In a corresponding manner, the braking moment being exerted at the front-wheel brakes increases from a value of 0 to its maximum value, starting at time $T_0$; whereas, at the rear-wheel brakes, there is still no significant amount of braking action. At time $T_1$, the program realizes that the maximum braking action is being exerted at the front-wheel brakes. This leads, starting at time $T_1$ according to FIGS. 3b and 3c, to an increase in the current in the rear-wheel brakes and thus to a corresponding increase in the braking action up to the intended maximum value. During panic braking, the predefined values (possibly corrected by an anti-wheel lock control system) are maintained. At time $T_3$, the driver releases the brake pedal very quickly. The actuation speed exceeds a predefined limit, which means that it is necessary for the brake to be released very quickly. In correspondence with the described procedure, the current in the rear-wheel brakes is reduced to zero as specified starting at time $T_3$ and possibly built up in the opposite direction. Thus the braking moment decreases. After a certain delay, the corresponding measure is implemented at the front-wheel brakes, starting at time $T_4$.

If the driver releases the pedal slowly at time $T_3$, and if the degree of actuation falls below the defined threshold, the program realizes that the panic braking situation is over and adjusts the front-wheel and the rear-wheel brakes simultaneously in accordance with the current nominal and actual values (normal operation).

The brake control system described above can be applied not only to brake systems with a redundant electrical system in the vehicle but also to brake systems which have only a single voltage source (battery).

What is claimed is:

1. A wheel brake system for a vehicle comprising:

electric motor driven actuators, each of which is associated with a wheel brakes;

each of the electric motor driven actuators is connected via a respective mechanical connection with the respective wheel brake;

each of the electric motor driven actuators via the mechanical connection the respective wheel brake;

the actuators being supplied with current from at least two independent power sources, one power source supplies the actuators for one set of wheels and the other source supplies the actuator for a different set of wheels;

an electric control unit in response to the drivers braking request applies drive signal to the electric motor driven actuators of the wheel brakes; and wherein the electronic control unit supplies wheel brakes via a first current and a second current according to the group consisting of: the first current which acts on both wheel brakes of the front axle, or acts on one wheel brake on the front axle, and on one wheel brake on the rear axle; and the second current which acts on both wheel brakes of the rear axle, or acts one wheel brake on the front axle, and or one wheel brake on the rear axle.

2. Wheel brake according to claim 1, wherein one power source is assigned to one front wheel brake and one rear wheel brake and another power source is assigned to the other wheel brake and the other rear wheel brake.

\* \* \* \* \*

UNITED STATES PATENT AND TRADEMARK OFFICE
CERTIFICATE OF CORRECTION

PATENT NO. : 6,081,081
DATED : June 27, 2000
INVENTOR(S) : Wolfgand Maisch

It is certified that error appears in the above-indentified patent and that said Letters Patent is hereby corrected as shown below:

In column 4, line 19, change "T" to -- $\tau$ --.

Signed and Sealed this

Third Day of April, 2001

Attest:

NICHOLAS P. GODICI

*Attesting Officer*  *Acting Director of the United States Patent and Trademark Office*